United States Patent [19]

Mason et al.

[11] Patent Number: 5,309,141
[45] Date of Patent: May 3, 1994

[54] EMERGENCY DECELERATION WARNING DEVICE

[76] Inventors: Christopher C. Mason, 4345 Zurich Dr., Colorado Springs, Colo. 80920; George A. Swift, 17703 NE. 34th, Redmond, Wash. 98052; James A. Edwards, 240 SW. Francis La., Issaquah, Wash. 98027

[21] Appl. No.: 843,397

[22] Filed: Feb. 27, 1992

[51] Int. Cl.$^5$ .............................. B60Q 1/50
[52] U.S. Cl. .................. 340/467; 340/464; 200/61.45 R; 200/61.53
[58] Field of Search ............ 340/467, 463, 464; 200/61.45 R, 61.53

[56] References Cited

U.S. PATENT DOCUMENTS

| | | |
|---|---|---|
| 3,559,164 | 1/1971 | Bancroft et al. |
| 3,760,353 | 9/1973 | Hassinger |
| 3,846,749 | 11/1974 | Curry |
| 4,258,353 | 3/1981 | Carlson |
| 4,320,384 | 3/1982 | Carlson ........................ 340/467 |
| 4,357,594 | 11/1982 | Ehrlich et al. |
| 4,418,331 | 11/1983 | Chicoine ........................ 340/467 |
| 4,663,609 | 5/1987 | Rosario ........................ 340/467 |
| 4,800,377 | 1/1989 | Slade ........................ 340/467 |
| 4,983,953 | 1/1991 | Page ........................ 340/467 |
| 4,990,887 | 2/1991 | Lee ........................ 340/463 |
| 5,059,947 | 10/1991 | Chen ........................ 340/467 |
| 5,148,147 | 9/1992 | Kobres ........................ 340/467 |
| 5,172,095 | 12/1992 | Scott ........................ 340/467 |

Primary Examiner—John K. Peng
Assistant Examiner—Nina Tong
Attorney, Agent, or Firm—Hughes & Multer

[57] ABSTRACT

Emergency deceleration warning devices which may also be manually activated to provide a warning in situations where abnormal deceleration is not involved. The disclosed devices are self-contained units which include: (1) a flasher which is highly visible, even in bright daylight; (2) a circuit for turning the flasher on and off; and (3) a simple, enclosed decelerometer for enabling the flasher-operating circuit when a vehicle equipped with the warning device is decelerated at an abnormal rate.

14 Claims, 6 Drawing Sheets

EMERGENCY DECELERATION WARNING DEVICE

The present invention relates to warning devices and, more particularly, to novel, improved devices for visually warning others that a vehicle equipped with the device is decelerating at an abnormal rate and may accordingly pose a clear and present danger. As employed herein, "abnormal deceleration rate" and similar terms are intended to mean collisions and other impacts as well as panic stops and other decreases in speed which might pose a danger to a following vehicle or vehicles.

In another aspect, the present invention relates to visual warning devices of the character just described which can also be turned on manually or in some other manner to warn of danger in circumstances in which the vehicle equipped with the device is not decelerating at a rapid enough rate to activate the device.

BACKGROUND OF THE INVENTION

Warning devices that are triggered or turned on by more rapid than normal deceleration of a vehicle are disclosed in U.S. Pat. Nos. 3,559,164 issued Jan. 26, 1971, to Bancroft et al., for VEHICULAR DECELERATION SAFETY CIRCUIT MEANS; 3,760,353 issued Sep. 18, 1973, to Hassinger for EMERGENCY VEHICULAR WARNING SYSTEM; 3,846,749 issued Nov. 5, 1974, to Curry for VEHICLE BRAKE LIGHT CONTROL SYSTEM; 4,258,353 issued Mar. 24, 1981, to Carlson for VEHICLE ACCELERATION/DECELERATION WARNING SYSTEM; and 4,357,594 issued Nov. 2, 1982, to Ehrlich et al. for VEHICULAR HAZARD WARNING SYSTEM.

The Bancroft system has the disadvantage that it is not a self-contained unit but is instead designed to be incorporated in the brake light circuit of the vehicle in which it is installed. This can be a comparatively difficult matter.

In addition, the deceleration sensing component of the Bancroft et al. device is a pendulum which is exposed and therefore subject to damage and misalignment. Furthermore, that pendulum operates an also exposed microswitch which is subject to wear and to damage by the fine, erosive particles stirred up by a moving vehicle.

Another disadvantage of the Bancroft et al. arrangement is that visual warning of vehicular deceleration is given by turning a conventional incandescent bulb on and off. This can only be done at a comparatively slow rate. Consequently, the visual warning display may not make it obvious to an observer that a dangerous situation exists.

Still another significant disadvantage of the Bancroft et al. device is that the pendulum which triggers the device is so designed and oriented that a mere sharp bump in a road, for example, could displace that pendulum enough to close the associated microswitch and turn the visual warning display on. This would be annoying to the driver of a following vehicle, at best. More likely, this would create a danger by falsely indicating that a panic stop was being made.

Still another disadvantage of the Bancroft et al. device is that the visual warning display remains on only so long as deceleration is severe enough to effect a microswitch-closing displacement of the switch-operating pendulum. Consequently, in the event of a short, but severe, deceleration, the visual warning display might not be on long enough to clearly indicate to an observer that a panic stop was being made.

Finally, there is no provision for manually operating the visual warning display of the Bancroft et al. device. This is a disadvantage because there are many situations not involving panic stops, such as a stalled vehicle, in which a visual warning display can also be employed to advantage.

Like that disclosed by Bancroft et al., the Hassinger system employs a visual warning display with conventional incandescent filaments. The Hassinger device may, therefore, likewise not prove capable of being turned on and off fast enough to provide a clear warning of a present danger.

Another disadvantage of the Hassinger system is that the control circuit for its visual warning display is enabled by a mercury switch. Switches of that type have the disadvantage in vehicular applications that the mercury tends to break up when the vehicle goes over a hard bump, for example, or is subjected to vibration on a dirt or other rough road. Once this occurs, the switch may stay on when it should turn off. Conversely, it may thereafter not come on when it should.

In addition, the Hassinger unit is designed to be mounted under the dash of the vehicle in which it is installed. This area is notoriously difficult to reach in a modern automobile. It would accordingly be difficult and expensive to install the Hassinger system in such a vehicle.

Furthermore, the Hassinger unit must be manually reset. This is a significant disadvantage because the device will be inoperative in a subsequent dangerous situation if the vehicle operator forgets to reset it.

In addition, the Hassinger device has a number of mechanical parts including pins, springs, adjustment screws, etc. These are subject to partial or total failure. In addition, it would be difficult and burdensome to make those adjustments after installation which are required for the Hassinger device to operate properly. Finally, like Bancroft et al., Hassinger makes no provision for manually operating the visual warning display of his device in circumstances which pose a danger but do not involve abnormal deceleration.

Carlson discloses yet another device which has the drawback that its visual warning display has an incandescent filament.

Also, the Carlson device is quite complicated and requires special wiring. Consequently, an actual unit of the character proposed by Carlson would be expensive to produce and install. And its complexity would make it less than optimally reliable.

Furthermore, the Carlson device is yet another one which must be manually reset. In his case, however, the situation is exacerbated because the visual warning display will continue to operate until the decelerometer is manually reset. Consequently, the visual warning display continues to flash, perhaps indicating that an emergency situation exists, long after the emergency has ended. This is particularly important because the driver of the vehicle may not be aware that the device is continuing to operate.

Yet another disadvantage of the Carlson system is that it employs a trigger relay to control the operation of the visual warning display. This is a drawback because relays of that character are unreliable when used in vehicles in which they are subject to shock and vibration.

The Curry device is yet another one which employs the brake lights of the vehicle in which it is installed to provide a visual display warning. Consequently, the Curry device has the same disadvantages as other warning devices employing that scheme.

Also, at least in part, the deceleration indicative input of the Curry device is taken from the speedometer cable of the vehicle in which the device is installed. This arrangement has the disadvantage that it is not capable of taking into account the nature of the terrain on which the vehicle equipped with the device is operating. For example, a much lower rate of deceleration is required to send a vehicle descending a steep hill into a skid than is necessary to cause that vehicle to skid while ascending the same hill. The speedometer cable-derived input of the Curry device is not capable of so altering the operation of that device's display-controlling circuitry to take factors such as the one just identified into account.

Furthermore, the Curry device employs extensive wiring and several pick-ups. As a practical matter, it could therefore only be installed in a vehicle while that vehicle was being manufactured. Thus, the Curry device has the disadvantage that it probably would not be practical to install in an already manufactured vehicle even at the dealer level.

An extremely complicated vehicular warning device is disclosed in the Ehrlich et al. patent. That device has a large number of mechanical components including four sensors, mechanical clutches, etc. As a result, the Ehrlich et al. device would be expensive to manufacture and to maintain. It would be less than optimally reliable because of the failure susceptibility of its many mechanical components.

In fact, the Ehrlich et al. device is so complicated that it requires extensive adjustments after the device is installed. This could make installation impractically expensive by placing it beyond the reach of the average vehicle owner.

Furthermore, the Ehrlich et al. device would necessarily have a relatively slow response time: (1) because of the above-mentioned mechanical components, and (2) because the turning on of the visual warning display is controlled by a relatively slow acting, mechanical relay.

In addition, the Ehrlich et al. device is yet another one which utilizes a visual warning display with an incandescent filament. It, too, has the above-discussed disadvantages appurtenant to that type of display.

Yet another disadvantage shared in common by those above-discussed systems employing low mounted, dual vehicular brake lights as a visual warning display is that an observer able to see the light at only one side of a vehicle may mistakenly take the flashing display for a turn signal rather than a warning of a present danger.

SUMMARY OF THE INVENTION

We have now invented, and disclosed herein, certain new and novel emergency deceleration warning devices which do not have the disadvantages of those prior art warning devices disclosed above and which, moreover, have a number of significant features not possessed by those devices.

Generally speaking, our novel emergency deceleration warning device is a self-contained unit comprising: (1) a high speed flasher or visual warning display, (2) a circuit for turning the flasher on and off, and (3) a simple, enclosed decelerometer for enabling a flasher-operating circuit when a vehicle equipped with the warning device is decelerated at a rate exceeding that associated with normal braking. This unit is designed to be prominently mounted on the rear deck of an automobile or at the top of a station wagon or hatchback rear window. The flasher-operating circuit of the device is designed to be connected directly to the hot terminal of the vehicle's battery and to the vehicle ground.

One above-alluded-to advantage of the novel emergency warning devices disclosed herein is that the flashers we employ, typically consisting of a xenon-filled bulb, are capable of emitting light at a high intensity only a few milliseconds after they are turned on. Consequently, an almost instantaneous warning can be given when an emergency arises. Also, these visual warning devices can be flashed at a rate which eliminates any confusion between them and turn signals, brake lights flashed off and on by the pumping of vehicular brakes, etc.

Also, our novel devices give a warning of a dangerous deceleration whereas normal brakelight systems do not. In addition, our novel devices will give a warning of dangerous deceleration even when vehicles in which they are incorporated are operated by those unfortunately numerous drivers who habitually ride their vehicle's brakes and therefore keep the vehicle's brake lights turned on whether or not it is slowing down.

Another advantage of our novel devices, attributable to the type of visual warning display we employ, is that the flasher-emitted light is of a character which makes it highly visible even in the brightest sunlight.

In view of the attributes of the visual warning devices just described, there is little chance that the warning they afford will not be seen or that it will be confused with a different warning signal.

In conjunction with the foregoing, it is another feature of our novel emergency deceleration warning devices that the rate at which the visual warning display is turned on and off can be adjusted. This makes it possible to adjust the flash rate to a distinctive one without making this rate so fast that the human eye cannot distinguish individual flashes.

Yet another advantage of our novel emergency deceleration warning devices is their mechanical reliability. This reliability is obtained: (1) by employing solid state circuitry to turn the visual warning display on and off, (2) by a novel design which requires only a single sensor to provide deceleration information to that circuitry and therefore has a minimum number of moving and other mechanical parts, and (3) by the self-contained design of the device. This self-contained design promotes reliability as does the fact that the visual warning display-operating circuit is wired to the battery of the vehicle in which the device is installed. With this novel type of hook-up, our novel warning device can continue to operate even if the brake light, turn signal, and/or emergency flasher systems of the vehicle fail.

Only three (or at most four) leads are required to hook up the novel emergency deceleration warning devices disclosed herein. Moreover, even that small number of wires suffices to hook up both: (1) the visual warning display of the device, and (2) more conventional lamps included in the device and intended to be wired into the brake light system of the vehicle in which our device is installed to provide an additional highly visible warning when the vehicle's brakes are applied as required by the Department of Transportation on 1985 and later automobiles.

Also, because our novel emergency deceleration warning devices are extremely simple, have a minimum number of moving and other mechanical parts, and are self-contained, they are inexpensive to produce and have a long service life.

A related advantage is that, unlike prior art devices such as that disclosed in the above-discussed Ehrlich et al. patent, adjustment and debugging of the device are not required after installation.

Another important, safety-related feature of our novel vehicle deceleration warning devices is that the visual warning display is automatically activated to provide a warning when the vehicle equipped with the device is turned over or tipped at an angle greater than that is assumes under normal operation. This could occur, for example, if the vehicle is rolled over or runs off the road into a ditch.

In conjunction with the foregoing, our novel deceleration warning devices can also be turned on by a typically dash-mounted, manually operable switch. This switch is employed to enable the visual warning display operating circuit allowing the warning device to function in a manner akin to or in conjunction with an emergency flasher system at a slower rate of one flash per second. At the same time, it provides a more visible warning than a conventional emergency flasher system does.

Yet another advantage of our novel emergency deceleration warning device is that it automatically compensates for the change in deceleration that might cause a skid as the vehicle in which it is installed travels up or down a steep hill. Also, it can be adjusted to compensate for the surface over which the vehicle equipped with it is traveling; i.e., for rough and bumpy surfaces, wet surfaces, snowy and icy surfaces, etc.

Also, a sonar or other type speed-to-distance sensor may be readily attached to automatically trigger the visual warning display if a preset distance-to-speed ratio between our equipped vehicle and a following vehicle is violated.

Another, and also significant, feature of our invention is that accessories which will provide still other useful inputs and outputs of information may be readily added. For example, a deceleration responsive signal which can be decoded and thereafter employed to automatically adjust the device and compensate for different road surfaces can readily be added. So can an output which could be activated with the visual warning display in the event of an accident to transmit an emergency message to the appropriate authorities.

Another, and also significant, feature of our invention is a novel circuit which insures that the visual warning display remains on for at least a preselected, minimum length of time after it is first turned on. This is important in situations such as those involving a brief, but extremely rapid, deceleration. Absent activation of the visual warning display for the selected length of time, that display might not remain on for a sufficient length of time to provide a clear warning. Of course, if the deceleration (or other emergency) lasts longer than the selected minimum, the visual warning display will continue to be activated for as long as the deceleration of the vehicle exists plus five seconds.

Also, our novel emergency deceleration warning devices are equipped with a novel thermal overload circuit which keeps the device from failing from overheating but nevertheless allows the visual warning display to continue to operate with only brief interruptions in which the temperature sensitive components of the device cool off. Associated circuitry, however, insures that the visual warning display remains on for a long enough period to convey an adequate warning (typically five seconds) even if the thermal protection is activated.

Also, our novel emergency deceleration warning devices are equipped with a novel threshold voltage shutoff circuit which keeps the device from running the battery below a predetermined amount of charge needed to start the vehicle. Associated circuitry, however, insures that the visual warning display remains on for a long enough period to convey an adequate warning (typically five seconds) even if the minimum threshold is reached.

OBJECTS OF THE INVENTION

From the foregoing, it will be apparent to the reader that the primary object of the present invention resides in the provision of novel, improved emergency deceleration warning devices for automobiles and other vehicles.

Other also important but more specific objects of the invention reside in the provision of emergency deceleration warning devices as described in the preceding object:

which provide a visual warning display that is visible under the most adverse conditions and which is unlikely to be confused with other warning signals;

in which, in conjunction with the preceding object, the visual warning display is a high intensity gas discharge tube which can be operated at a factory or user adjustable rate;

which are mechanically reliable;

which, in conjunction with the preceding object, employ a solid state circuit to turn the visual warning display on and off and which can have a single decelerometer and an absolute minimum of moving parts;

which are self-contained units with visual warning display operating circuits that are designed to be wired directly to the batteries of the vehicles in which they are installed;

which are also capable of providing a visual indication of normal braking;

which will continue to operate even though the brake light, turn signal, and/or emergency flasher systems of a vehicle equipped with the device should fail;

which are relatively inexpensive to produce;

which have a long service life;

which are simple to install and do not require adjustment after installation;

which include a visual warning display that is activated to flash a warning when the vehicle in which it is installed is turned over or tipped at an angle greater than that it is designed to assume during normal operation;

which can be activated manually and are therefore capable of being employed to warn of a stalled vehicle or other emergency hazard not involving abnormal deceleration;

which can be adjusted to compensate for the character of the surface over which the vehicle equipped with the device is traveling;

which automatically compensate for the steepness of the terrain over which the vehicle equipped with the device is traveling;

which are versatile in that accessories which will provide yet other advantages can be readily added;

which are so designed as to provide a visual warning for at least a minimum period of time upon being activated;

which have a thermal protection system that allows the device to continue to operate, albeit with momentary interruptions, in circumstances in which heat sensitive components of the device may tend to become overheated;

which has a slower flash mode in which the current drawn from the vehicle battery is reduced to provide a longer potential warning period; and which will operate until the battery voltage drops to a threshold voltage and then shuts off so that the battery will retain enough charge to start the vehicle engine.

Other important objects and features and additional advantages of the invention will be apparent to the reader from the foregoing and the appended claims and as the ensuing detailed description and discussion of the invention proceeds in conjunction with the accompanying drawing.

DETAILED DESCRIPTION OF THE INVENTION

Figure 1:
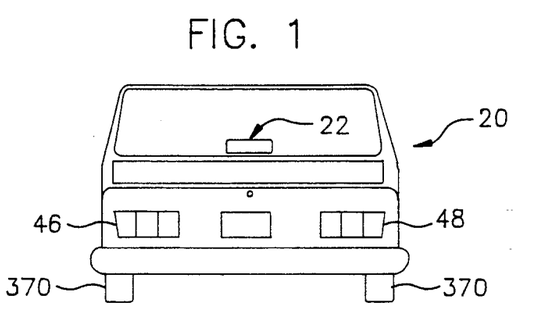
FIG. 1 is a rear view of an automobile equipped with an emergency deceleration warning device embodying the principles of the present invention.

Referring now to the drawing, FIG. 1 depicts an automobile 20 equipped with an emergency deceleration warning device 22 embodying, and constructed in accord with, the principles of the present invention. Typically, warning device 22 will be mounted on the rear deck of an automobile such as that shown in FIG. 1 by an appropriate bracket (not shown).

In the case of a hatchback or station wagon, the warning device can instead be installed in the location commonly employed for the third light of the vehicle braking system. It can be affixed to the vehicle in same manner as the latter.

Figure 2:
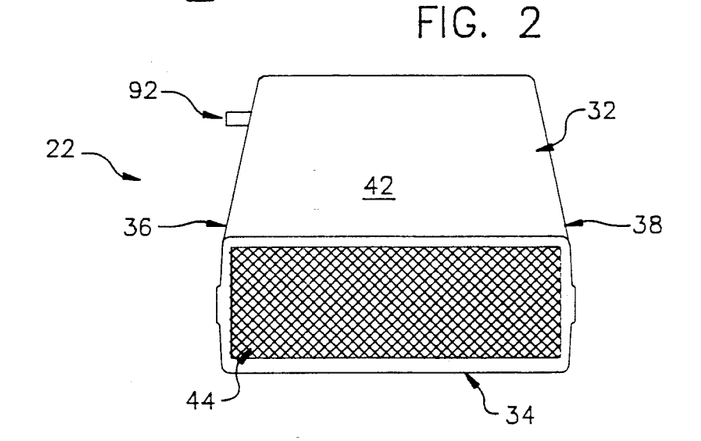
FIG. 2 is a pictorial view of the warning device shown in FIG. 1.
Figure 3:
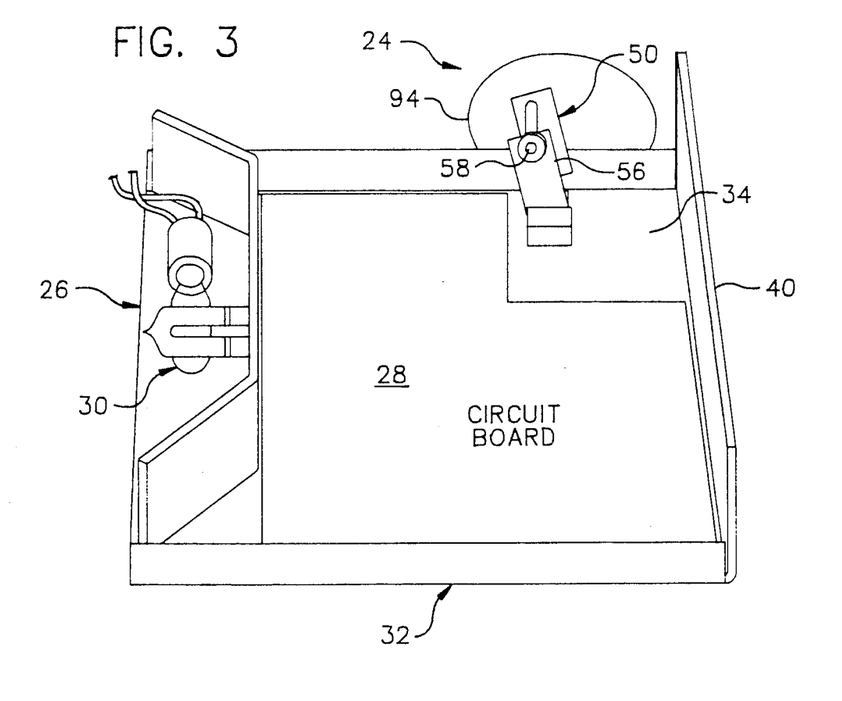
FIG. 3 is a plan view of the warning device with part of its housing removed to show the internal components of the device.

Referring now primarily to FIGS. 2 and 3, the major components of emergency deceleration warning device 22 are: (1) a decelerometer 24; (2) a high intensity discharge, xenon-filled bulb 26 which is turned on and off (i.e., flashed) by a circuit 27 containing components printed and/or mounted on a diagrammatically illustrated board 28; and (3) a conventional incandescent bulb 30. These components are mounted in a casing 32 which has a base 34, side walls 36 and 38, a rear wall 40, a top wall 42, and a red lens 44 which doubles as the front wall of the casing.

The circuit 27 alluded to above turns the xenon-filled bulb or flasher 26 on and off to warn motorists following vehicle 20 that the vehicle is decelerating at a faster than normal rate detected by decelerometer 24. A flash rate of ten cycles per second will typically be employed to distinguish the visual warning given by device 22 from that generated by a turn signal or by the brakes of vehicle 20 being pumped repeatedly to turn brake lights 46 and 48 on and off. A gaseous discharge-type device such as the illustrated xenon-filled tube 26 is employed in our novel emergency deceleration warning device 22 rather than a conventional incandescent bulb because of the xenon flasher's faster response time and because it is much more visible in sunlight and other brightly illuminated settings.

Incandescent bulb 30 is wired in parallel with the lower mounted brake lights 46 and 48 of vehicle 20 and is therefore turned on and off with the latter. Thus, emergency deceleration warning device 22 also doubles as, and meets the requirements of, now federally mandated, high mounted, third brake lights.

Referring now to FIGS. 3-6, the decelerometer 24 employed to measure the deceleration of vehicle 20 is supported from the side of the base 36 of warning device casing 32 by an L-shaped bracket 50. That bracket has a base 52 and a vertical leg 54. A pendulum 56 is pivotably supported, at its upper end, from the vertically extending leg 54 of bracket 50 by a pivot member 58. This pivot member extends through bracket leg 54, a spacer 60, and the upper end of pendulum 56. Various washers 62 . . . 68 are provided so that pendulum 56 can swing about pivot axis 70 without binding; and a conventional retainer 71 is employed to hold together the assembly of pivot member 58, spacer 60, and pendulum 56.

Figure 4:
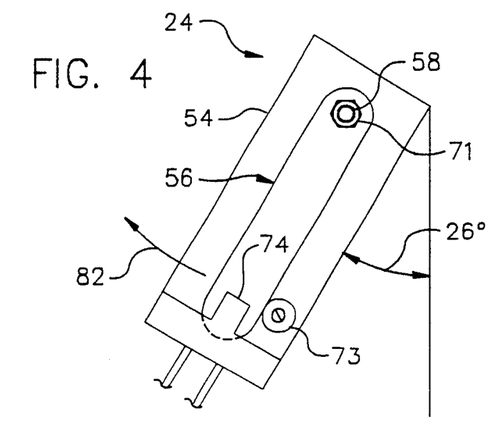
FIG. 4 is a side view of a decelerometer incorporated in the emergency deceleration warning device.
Figure 5:
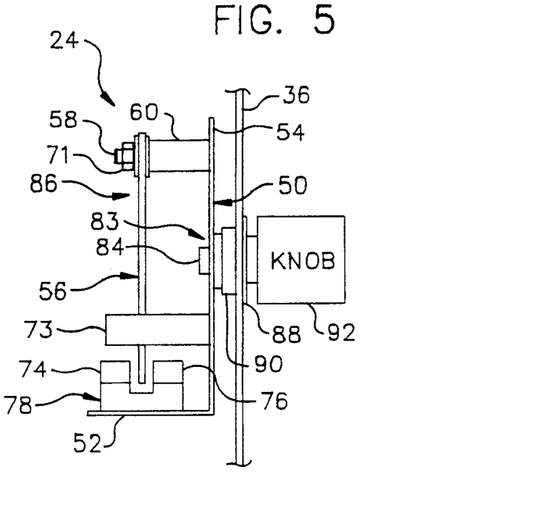
FIG. 5 is an end view of the decelerometer.
Figure 6:
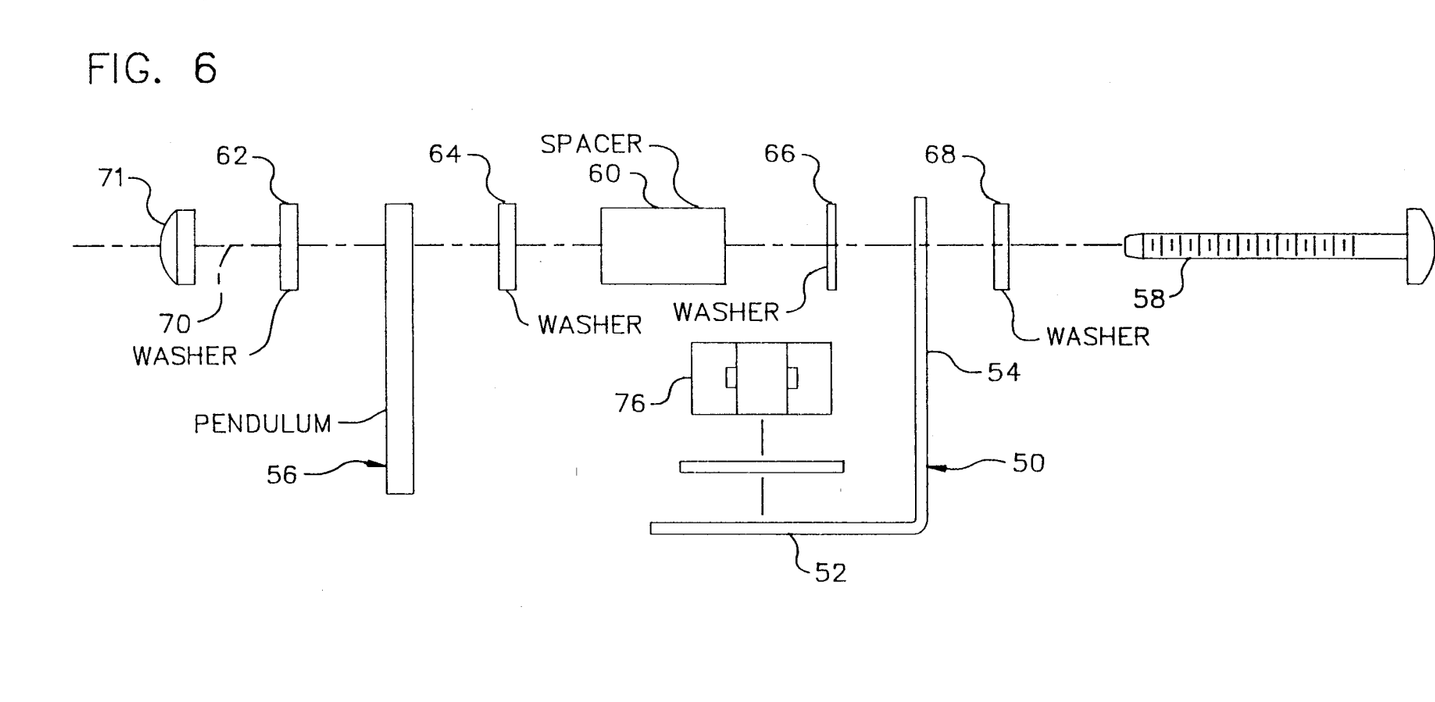
FIG. 6 is an exploded view of the decelerometer.

Absent deceleration, pendulum 56 is supported at a selected angle from the vertical (typically, ca. 26°) by a stop or rest 73. That stop is fixed to the vertically extending leg 54 of bracket 50 toward the lower end of the latter.

In this illustrated position, pendulum 56 interrupts a beam of infrared or visible radiation which otherwise can pass from the emitter 74 to the detector or transducer 76 of an emitter/detector unit 78. That unit is mounted on the base 52 of bracket or support 50.

As vehicle 20 decelerates, pendulum 56 rotates about pivot axis 70 in the direction indicated by arrow 82 in FIG. 4 to an extent indicative of the deceleration rate. If that rate is high enough to pose a danger to a following vehicle, pendulum 56 will swing in the direction indicated by arrow 82 out of the line-of-sight between infrared radiation emitter 74 and detector 76. This causes detector 76 to output an electrical signal. That signal is employed to enable circuit 27, which thereupon turns gas discharge lamp 26 on and off at the selected flash rate to warn following vehicles that an emergency condition has arisen.

Circuit 27 remains on until the rate of deceleration of vehicle 20 drops below the set rate. At this point, pendulum 56 swings back towards pendulum rest 73 to once again interrupt the beam of infrared radiation or visible light from emitter 74. Detector 76 thereupon ceases to generate an electrical output. This disenables circuit 27; and flasher 26 goes off after it has continued to flash for a long enough period (typically 5 seconds) to clearly warn those vehicles following vehicle 20 that the latter has been braked at an abnormal rate.

The angle at which pendulum 56 is supported by pendulum rest 72 can be adjusted to change the swing arc and, therefore, the deceleration required for pendulum 56 to clear the beam of radiation from emitter 74 and thereby allow detector 76 to enable visual warning display-operating circuit 27 in the manner discussed above. This is typically done to match the operation of emergency deceleration warning device 22 to the condition of the road or other surface over which vehicle 20 is traveling. For example, lighter braking is required to produce an imperiling skid or other dangerous condition that should be warned of on a wet, snowy, or icy surface then is required on a dry surface. Therefore, warning device 22 is preferably adjusted when vehicle 20 is traveling over one of those more slippery surfaces so that a lower rate of deceleration will cause circuit 27 to be enabled.

The adjustment just discussed is provided by an adjustment mechanism 83 which includes a shaft 84 supporting the assembly 86 of bracket 50, pendulum 56, pendulum rest 73, and emitter/detector unit 78 from the side wall 36 of emergency deceleration warning device casing 32. Shaft 84 is fixed to the vertical leg 54 of bracket 50 in any convenient fashion which requires that the bracket rotate with the shaft. The shaft is also fixed to casing side wall 36, in this case by retainers 88 and 90 on opposite sides of the casing wall. These retainers also generate sufficient friction between the shaft and the casing wall 36 to retain shaft 84 in the position to which it is rotated.

Rotation of shaft 84 is effected by a knob 92 fixed to the outer end of the shaft on the exterior side of casing 36. A dial (not shown in FIG. 5 for the sake of convenience but identified by reference character 94 in FIG. 3) may be fixed to shaft 84 in concentric relationship with shaft 84 to facilitate the adjustment of decelerometer 24. This dial can be calibrated in terms of G force or, alternatively, in terms of road surface by employing designations such as "dry," "bumpy," "wet," and "snowy or icy."

Figure 11:
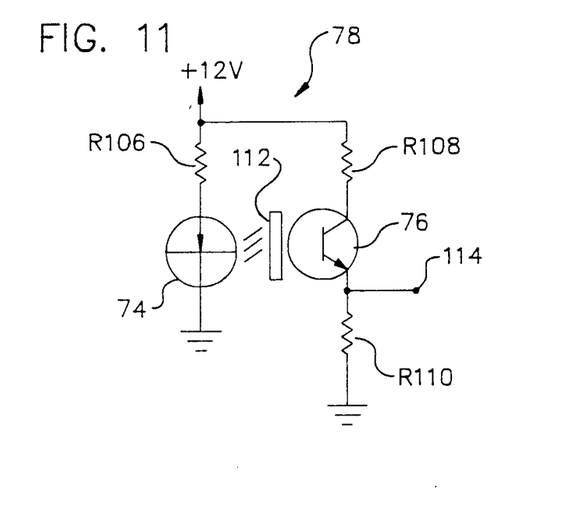
FIG. 11 is a schematic of a circuit employed in the device of FIG. 2 to provide an electrical signal when the deceleration of a vehicle equipped with the device reaches or exceeds a preselected threshold rate.

We pointed out above that the circuit 27 shown in FIG. 11 is enabled, resulting in flasher 26 being turned on and off at a typical ten cycle per second rate, when vehicle 20 decelerates at a fast rate. This is because abnormally rapid deceleration causes pendulum 56 to swing in the direction indicated by arrow 82 in FIG. 4 to the extent that radiation from the emitter 74 of unit 78 falls on detector 76 and causes the detector to generate an enabling electrical input for circuit 27.

Now referring again to the drawing, FIG. 11 depicts in more detail a preferred emitter/detector unit 78 for supplying the electrical pulse required to enable circuit 27. The major components of emitter/detector unit 78 include: (1) photo emitter 74, (2) photo detector 76, and (3) three resistors R106, R108, and R110. These are, respectively: a current limiting resistor for photo emitter 74, a protective device for photo detector 76, and a biasing resistor for the photo detector.

As is also shown in FIG. 11, photo detector 76 is connected across, and is always enabled by, plus 12 volt power supply (not shown). This power supply will typically be an automobile or other vehicular battery.

We pointed out above in conjunction with the decelerometer illustrated in FIGS. 4–6 of the drawing that photo detector 76 outputs an electrical pulse when the active element of the decelerometer is displaced to an extent which allows the beam of light from photo emitter 74 to fall upon the detector. This decelerometer element is illustrated diagrammatically in FIG. 11 and identified by reference character 112 because it does not necessarily have to be a pendulum like that identified by reference character 56.

The electrical output signal from photo detector 76 appears at terminal 114, which is also shown in FIG. 12. Turning now to the latter figure, the photo detector output is routed from terminal 114 through diodes 116 and 118 and a biasing resistor R120 to the base of a transistor 122. Diode 116 isolates the detector unit 76 shown in FIG. 11. Diode 118 similarly isolates certain accessory inputs of circuit 27 which are described in detail hereinafter.

Connected in parallel with resistor R120 is a second biasing resistor R124. Two additional biasing resistors R126 and R128 are connected in series between the collector of transistor 122 and the base of a second transistor 130.

As a consequence, the output from photo detector 76 turns on transistors 122 and 130. That connects the emitter of transistor 130 through a fuse 131 to the plus 12 volt power source. As indicated above, that power source is typically the battery of the vehicle in which emergency deceleration warning device 22 is installed or the ignition side of the ignition switch.

This plus 12 volt signal is applied to input terminals or pins 12, 11, and 8 of a solid state switching regulator 132 such as a TL494 or a TL594. Such regulators are available from a number of manufacturers including Texas Instruments. Switching regulator 132 is employed in transforming the plus 12 volt input pulse to a plus 200 volt output signal required to operate the high energy discharge tube or visual warning display 26.

A bypass capacitor C133 is connected between these pins and ground to stabilize the plus 12 volt enabling signal routed to switching regulator 132 from transistor 130.

An indicator lamp 134 is also connected across inputs 12, 11, and 8 through a current limiting resistor R136. This lamp accordingly turns on when a panic stop or other abnormal deceleration of the vehicle equipped with emergency deceleration warning device 22 is made. This provides an indication that circuit 27 has been enabled and the threshold G-force has been reached.

Circuit 27 can also be enabled and indicator lamp 134 turned on by any one of the accessory inputs mentioned briefly above. These are identified by reference characters 138, 140, 142, and 144 in FIG. 12.

These inputs respectively feed into diodes 139, 141, 143 and 145, isolating each of the inputs from each other.

The first of these inputs, 138, is from the emergency flashers of vehicle 20. It causes visual warning display 26 to be flashed on and off when the emergency flashers of vehicle 20 are turned on.

Input 140 is from the above-referred to, dash-mounted switch. Input 140 allows circuit 27 to be enabled manually and visual warning display 26 activated in the circumstances discussed above.

The third input 142 is from the back-up light circuit of vehicle 20. A signal from this input results in circuit 27 being activated and providing a warning when vehicle 20 is backing up by flashing visual warning display 26 on and off.

Finally, the fourth input 144 may be from the emergency light system of a police vehicle, ambulance, etc. when the device is used in such vehicles.

Inputs may be taken from still other warning systems of the vehicle equipped with emergency deceleration warning device 22 to optimize that device for a particular application.

The enabling of circuit 27 via the detector unit 78 shown in FIG. 11 will typically cause visual warning display 26 to be turned on and off at a rate of ten cycles per second. In contrast, if that circuit is enabled via any one of the inputs 138, 140, 142, or 144, display 26 will instead typically be turned on and off at a slower rate of one cycle per second. This is done for several reasons—(1) to conserve electrical energy; (2) to distinguish the display generated in an abnormal deceleration situation from the other, just-discussed warnings that display 26 might be employed to provide; and (3) to extend the length of time for which circuit 27 can be operated indefinitely without becoming overheated. This is important because a longer warning will typically be in order in the just-described circumstances than is needed in an emergency deceleration situation.

Referring still to FIG. 12, with the plus 12 volt input signal applied to switching regulator 132, plus 12 volt, sequential pulses appear alternately at output pins 10 and 9 of the switching regulator. These pulses are routed through current limiting resistors R146 and R148 and biasing resistors R150 and R152 to transistors 154 and 156. Those transistors convert the sequential signals appearing at pins 10 and 9 of the switching regulator to an alternating 24 volt peak-to-peak signal (referenced to A and B in FIG. 12).

The output from the transistor circuit just described is applied across the primary 158 of a transformer 160 wired in a push-pull configuration. Here, the output signals from transistors 154 and 156 are converted to the higher voltage needed to operate visual warning display 26. Typically, this voltage will be alternating 400 volts peak-to-peak with respect to reference points C and D.

A bypass capacitor C160 is connected from the plus 12 volt power supply to ground and to the center tap of transformer primary 158. This capacitor provides ripple rejection. That is necessary because the high frequencies involved would otherwise cause the output signals from transistors 154 and 156 to be reduced.

The output from transformer secondary 162 is applied to the inputs of a full wave rectifier consisting of diodes 164, 166, 168, and 170. This rectifier converts the alternating 400 volt peak-to-peak signal appearing across reference points C and D to a plus 200 volt charging voltage for a capacitor C172 connected across the rectifier output terminals.

Capacitor C172 is employed to store the charge needed to enable visual warning display 26 and to turn off switching regulator 132. Specifically, when capacitor C172 is charged to a voltage matching that at the output of a divider network consisting of resistors R174 and R176, the sequential output pulses are not longer available at pins 10 and 9 of switching regulator 132. The input voltage to the divider network is supplied from capacitor C172 and fed to input pin 1 of switching regulator 132.

The circuitry just described provides a constant voltage for operating visual warning display 26, thereby controlling the brightness of the flash provided by that display when its xenon gas is ionized. This brightness control is deemed necessary because, in a typical vehicular application, the voltage appearing at input terminal 178 can vary widely—for example, between 9 and 15 volts (the actual output voltage depends upon the state of charge of the vehicle's battery, the resistance in the vehicle's wiring, and the operation of the vehicle's voltage regulator). Therefore, the brightness of the flash provided by the visual warning display 26 could vary to an unacceptable extent unless the battery output was converted to a constant operating voltage.

When capacitor C172 is charged to the level at which its voltage matches the output voltage from the divider network consisting of resistors R174 and R176, the divider network output voltage will be higher than the output voltage of a divider network consisting of resistors R180 and R182 (the input voltage for that divider network is a plus 5 volts supplied from pins 13 and 14 of switching regulator 132). This causes a plus 5 volt, capacitor charging signal to appear at pin 3 of the switching regulator. That signal is routed through diode 184 and a capacitor C186 to ground. Diode 184 provides isolation between capacitor C186 and the switching regulator.

A second, associated capacitor C188 is connected across output pins 3 and 2 of switching regulator 132. Capacitor C188 reduces current surge when the signals at pins 10 and 9 of switching regulator 132 are made unavailable by application of the matching voltage described above. This is important as it reduces noise in the circuit.

When capacitor C186 is charged, a plus 5 volts signal is routed through a chip-to-chip isolation resistor R189 to one input of a NAND gate 190. A second resistor R192 is connected to ground between capacitor C186 and isolation resistor R189. This resistor and capacitor C186 together constitute a timing circuit which supplies an operating pulse of adequate width to a timing circuit composed of the just-mentioned NAND gate 190 and a second NAND gate 194. The timing circuit including the two NAND gates is employed to turn visual warning display 26 on and off at a controlled, typically ten or one cycle per second rate.

With the plus 5 volt signal applied to input 2 of NAND gate 190, a signal will appear across the output of that gate because pin 1 is also supplied with a positive signal at that point in the operation of circuit 27 as will become apparent hereinafter.

With pins 1 and 2 of NAND gate 190 positive, a negative signal appears at output pin 3 of the gate. The negative signal is applied to pins 1 and 2 of NAND gate 194, causing a positive signal to appear at its output pin 3.

The positive signal appearing at pin 3 of NAND gate 194 is routed through a current limiting resistor R196 and a biasing resistor R198 to ground. The plus 5 volt signal is also routed to thyristor 200, turning the thyristor on.

This discharges a capacitor C202 which has heretofore been charged through a charge resistor R204. Capacitor C202 is charged at the same time as the above-mentioned capacitor C172.

Capacitor C202 discharges through a trigger transformer 206. That transformer steps up the capacitor discharge voltage to a level of sufficient magnitude to ionize the xenon gas in visual warning display 26. Typically, the step-up voltage will be in the range of 200 volts in to 4000 volts out.

Upon ionization, the xenon emits light at an intensity proportional to the capacitance of capacitor C172 multiplied by the voltage to which that capacitor is charged squared.

While visual warning display 26 is turned on, switching regulator 132 is turned off so that it will not continue to supply the output signal employed to turn visual warning display 26 on. Switching regulator 132 is turned off by a circuit which includes a bilateral field effect transistor switch 208. Field effect transistor switch 208 is turned on by the positive signal appearing at output pin 3 of NAND gate 194.

The turning on the field effect transistor switch 208 drops the output voltage from the divider network consisting of resistors R180 and R182 to ground. That blocks the theretofore available output signal from pin 2 of switching regulator 132.

With no signal appearing at switching regulator pin 2, the output signal from the divider network consisting of resistors R176 and R174 goes to ground. Therefore, capacitor C202 cannot be recharged to retrigger visual warning display 26.

It will be noted that an associated capacitor C210 is connected across the output pin 3 of NAND gate 194. This is a timing capacitor which regulates the rate at which visual warning display 26 is turned on and off.

Capacitor C210 is charged during that part of the operating cycle of circuit 27 in which the input of NAND gate 194 is low and a positive signal therefore appears at its output pin 3. When capacitor C210 reaches a threshold charge, a negative signal appears at pin 1 of NAND gate 190. This is because, as capacitor C210 charges, the magnitude of the signal appearing at pin 1 of NAND gate 190 decreases towards a threshold value. At that point, the NAND gate switches to a logic low, causing a positive signal to appear at its output pin 3. This causes pins 1 and 2 of NAND gate 194 to go positive, a negative signal thereupon appearing at the output pin 3 of that gate.

Capacitor C210 is connected to pin 1 of NAND gate 190 through a resistor R212 and a forward bias diode 214. Resistor R212 controls the charge rate of capacitor C210 during that part of the duty cycle in which a logic high or positive voltage appears at output pin 3 of NAND gate 194. This charge rate is so selected that visual warning display 26 will be turned on for a sufficient portion of each duty cycle to ionize the xenon gas and then extinguish the discharge.

Forward bias diode 214 drops resistor R212 out of the capacitor charge controlling circuit when NAND gate 194 is switched to a logic low; i.e., when a negative voltage appears at pin 3 of that NAND gate. Diode 214 thereby acts as a pulse width shaper, controlling the on time of NAND gates 190 and 194.

With NAND gate 194 at a logic low, capacitor C210 is recharged through a circuit consisting of an adjustable resistor R216, a fixed resistor R218, a field effect transistor switch 220, and a field effect transistor switch 222. Therefore the duty cycle just described can be repeated the next time a plus 5 volt enabling pulse appears at input pin 2 of NAND gate 190.

The circuit consisting of resistors R216 and R218 and field effect transistor switches 220 and 222 controls the time for which NAND gate 194 remains at a logic low and, as a consequence, the flash rate of visual warning display 26.

When NAND gate 190 reverts to a logic high state and a plus voltage signal is routed to adjustable and fixed resistors R216 and R218, field effect transistor switches 220 and 222 are turned on. This allows capacitor C210 to recharge to the level necessary to enable it to perform the function discussed when NAND gate 194 next reverts to a logic high due to the application of a plus 5 volt signal to its input pin 2.

Variable resistor R216 is employed to adjust the charging rate of capacitor C210 and, therefore, the rate at which the visual warning display 26 can be turned on and off.

A third resistor R224 is connected in series with resistors R216 and R218. This resistor decreases the on-off or flash rate of visual warning display 26 when one or both of the field effect transistor switches 220 and 222 are open while capacitor C210 is being charged. If this occurs, resistor R224 is connected in series with resistors R216 and R218 rather than being bypassed through switches 220 and 222. Consequently, capacitor C210 charges more slowly.

Field effect transistor switch 220 is turned off during the capacitor charging part of the duty cycle by a negative pulse appearing at pin 3 of NAND gate 226. This NAND gate is employed to decrease the rate of operation of visual warning display 26 after a specified period, typically 30 seconds. The decrease in the flash rate conserves the battery of the vehicle in which emergency deceleration warning device 22 is employed. This may be desirable if the vehicle has triggered the detector for a longer than normal time—for example, if the vehicle has gone into a ditch. In such cases, it is desirable to continue the warning provided by display 26 for an extended period of time.

The operation of NAND gate 226 is controlled by a R-C circuit which includes a resistor R228 and a capacitor C230. The input to this circuit is a plus 5 volts.

When capacitor C230 is charged, plus voltages appear at pins 1 and 2 of NAND gate 226; and a logic low (minus voltage) appears at output pin 3. This output signal is routed to field effect transistor 220, turning off that switch and placing resistor R224 in the capacitor C210 charging circuit as discussed above.

The charging of capacitor C230 is initiated when photoelectric detector 104 produces an output signal indicative of abnormal braking and switching regulator 132 is thereby enabled.

Field effect switch 222 is turned off to similarly increase the charging rate of capacitor C210 and produce a slower flash rate for so long as one or more of the four accessory inputs 138, 140, 142, and 144 is enabled. When this occurs, the typically plus 12 volt signal is applied to the base of a transistor 236 through: (1) the enabled input, for example the input 144 coupled to circuit 27 through diode 143, and (2) a circuit including a current limiting resistor R232 and a biasing resistor R234. This pulls the collector of transistor 236 to ground through a timing circuit.

That circuit is composed of a series-connected, current limiting resistor R238 and capacitor C240 and a parallel-connected, time constant-providing resistor R242. This timing circuit is operated by the plus 5 volt signal appearing at the input pins of switching regulator 132.

With the circuit including the just described R-C network activated, capacitor C240 charges, keeping the collector of transistor 236 at ground. With the transistor collector at ground, a negative voltage is applied to field effect transistor 222. That transistor is accordingly turned off. This connects resistor R224 into the capacitor C210 charging circuit, reducing the capacitor charging rate and thereby decreasing the rate at which visual warning display 26 is turned on and off or flashed.

Capacitor C240 will charge (or remain charged) for so long as one or more of the accessory inputs 138, 140, 142, and 144 is enabled. Consequently, the collector of transistor 236 will remain at or near ground; and field effect transistor switch will remain turned off, producing the wanted slow flash rate, until all enabling signals from the accessory inputs are removed and the resistor R242 and resistor R235 charge capacitor C240 to the threshold voltage.

Once there is no input from 138, 140, 142 or 144, visual warning display 26 will continue to be turned on and off for a minimum period of typically five seconds. The duration of this period is determined by a timing circuit which includes: (1) a capacitor C244; (2) an adjustable resistor R246 which allows the minimum duration to be adjusted; and (3) a fixed resistor R248 which sets the minimum time to which the period of operation of visual warning display 26 can be reduced. This circuit is connected between ground and the plus 5 volt signal appearing at the input pins to switching regulator 132.

The operating circuitry for visual warning display 26 is turned off after the above-mentioned period of minimum duration by a circuit which includes a transistor 250 connected in parallel through a biasing resistor R252 and a current-limiting resistor R254 to the five circuit enabling inputs 114, 138, 140, 142, and 144. A diode 256 between the four last-mentioned inputs and current limiting resistor R254 isolates input 114 from the four accessory inputs 138, 140, 142, and 144. Isolation is provided so that enabling input 114 will cause visual warning display 26 to flash rapidly whereas the other four inputs will instead cause visual warning display 26 to be operated at the slower rate.

With an input applied to the base of transistor 250, its collector goes low, applying logic low (minus voltage) signals to the input pins 1 and 2 of NAND gate 258. That causes a logic high or plus voltage signal to appear at the output pin 3 of that NAND gate. The output signal is routed to transistor 122: (1) through a diode 260, which isolates NAND gate 258 from the signals supplied from inputs 114, 138, 140, 142, and 144; and (2) then through current limiting resistor R120. This insures that transistors 122 and 130 remain on and that the enabling plus 12 volt voltage is therefore applied to the input pins of switching regulator 132 for the minimum period determined by the timing circuit consisting of capacitor C244 and resistors R246 and R248.

Once the minimum period runs, capacitor C244 charges; and the collector of transistor 250 goes logic high, as do the inputs 1 and 2 of NAND gate 258. A logic low therefore appears at NAND gate output 3. This drops the NAND gate out of the circuit controlling the operation of switching regulator 132, resetting or initializing circuit 27.

Figure 12A:
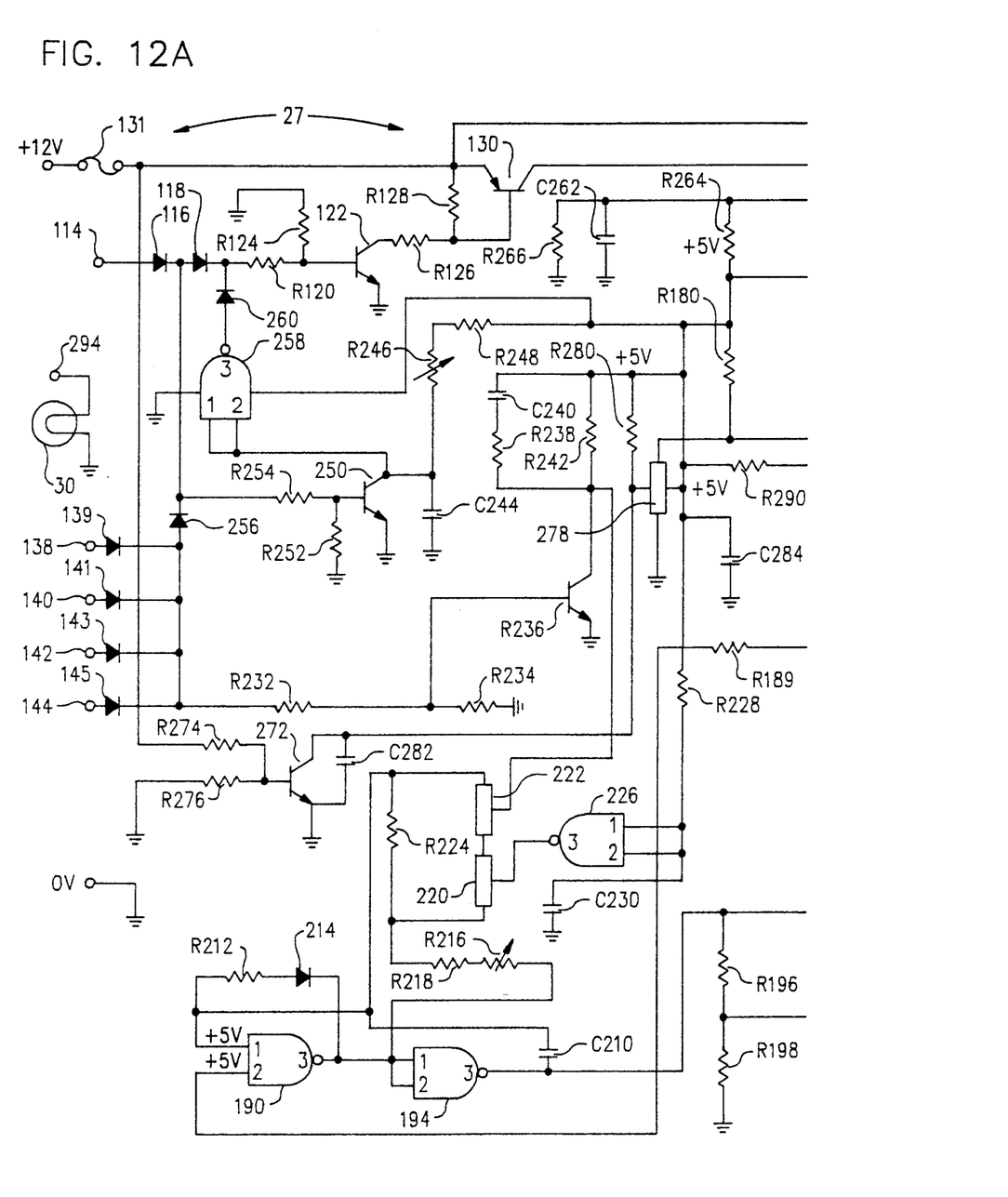
FIGS. 12A, 12B are a schematic of an electrical circuit employed in the warning device of FIG. 2 to operate a visual warning display incorporated in that device.
Figure 12B:
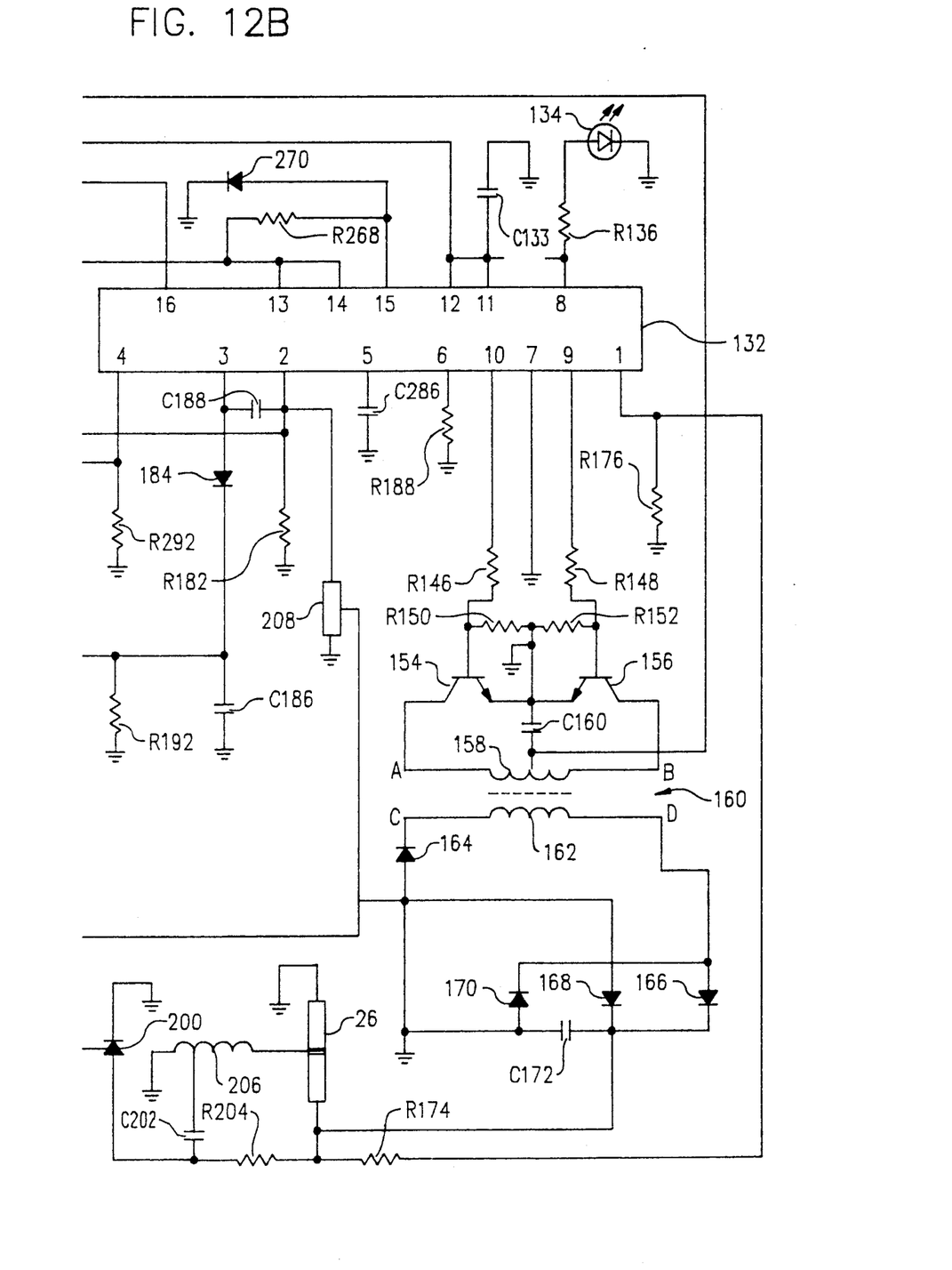

The circuitry shown in FIG. 12 comprises FIGS. 12A and 12B also includes a second timing circuit. This circuit insures that switching regulator 132 will remain on for a period of minimum duration (typically 5 seconds) once the switching regulator is enabled. This is necessary because a thermal protection circuit, described hereinafter, might otherwise earlier disenable switching regulator 132—for example, if the ambient temperature is very high. In that case, a warning of adequate duration might not be given.

The timing circuit in question includes a capacitor C262 and a resistor R264. Resistor R264 also cooperates with a resistor R266 to form a divider network. That network sets a reference voltage from the plus 5 volt supply to input pin 16 of switching regulator 132.

The just-mentioned thermal protection circuit protects switching regulator 132 and heat sensitive transistors 154 and 156 from overheating. It includes: (1) the above-mentioned timing circuit consisting of a capacitor C262 and resistor R264, (2) resistor R266, (3) resistor R268, and (4) a diode 270.

The diode 270 is disposed in intimate heat transfer relationship to heat sensitive transistors 154 and 156. Therefore, when the transistor temperature increases to a level above a threshold value, the P-N junction of the diode collapses; the voltage across the diode decreases; and the input voltage at pin 15 of switching regulator 132 becomes lower than the voltage at pin 16. This turns the switching regulator off until such time as the temperature of transistors 154 and 156 decreases to the threshold level. At this point, the voltage at input pin 15 again become higher than the voltage at pin 16; and switching regulator 132 is again enabled.

Because of the rapid dissipation of heat, the switching regulator will be off only momentarily; and emergency deceleration warning device will consequently remain out of operation for only a few seconds at most.

Yet another novel feature of the novel emergency deceleration warning device 22 described herein is a circuit which shuts off visual warning display 26 when the power supply voltage drops below a selected, minimum level. In a vehicular application of our invention, this results in the device being turned off while there is still enough energy in the vehicle's storage battery to restart the vehicle.

The circuit just described includes a transistor 272 connected to the plus 12 volt power supply through a voltage divider consisting of resistors R274 and R276 and employed to supply the appropriate threshold voltage to the transistor. This turns transistor 272 on.

With the transistor conducting, its collector is low; and a field effect transistor switch 278 wired to that collector is turned off. This enables switching regulator 132.

As the voltage applied to the base of transistor 272 through the divider network consisting of resistors R274 and R276 drops below the threshold level, the collector of transistor 272 is raised to a plus 5 volt potential by a R-C circuit consisting of a resistor R280 and a capacitor C282. This turns on field effect transistor switch 278. That brings the potential on output pin 2 of switch regulator 132 to zero, disenabling the switching regulator.

The R-C or timing circuit composed of resistor R280 and capacitor C282 is provided so that the switching regulator can be enabled and visual warning display 26 turned on and off for a minimum period (typically five seconds) even though the battery voltage may drop below the threshold value during that period.

A capacitor C284 is connected to ground and the plus 5 volt power source repeatedly referred to above. This is a bypass capacitor again provided for ripple rejection.

Also, a capacitor C286 and a resistor R288 are connected between input pins 5 and 6 of switching regulator 132 and ground. The capacitor and resistor together constitute an R-C circuit which controls the frequency at which switching regulator 132 operates. Typically, the switching regulator will be operated at a frequency in the range of 40-45 kHz.

Also, two resistors R290 and R292 are connected to input pin 4, ground, and the plus 5 volt supply. These resistors are used to limit the maximum pulse signal from output pins 10 and 9 and, in so doing, to limit the maximum current surge from the vehicle battery.

The final component of the emergency deceleration warning device 22 illustrated in FIG. 12 is the above-discussed incandescent lamp 30 which is turned on and off in unison with vehicle 20's lower mounted stop lights 46 and 48. One terminal of lamp 30 is connected to ground. The other terminal 290 is connected to the operating system of brake lights 46 and 48 directly or through a control module (not shown) which is typically provided to coordinate the operation of the brake and turn signals of a modern automobile.

Figure 7:
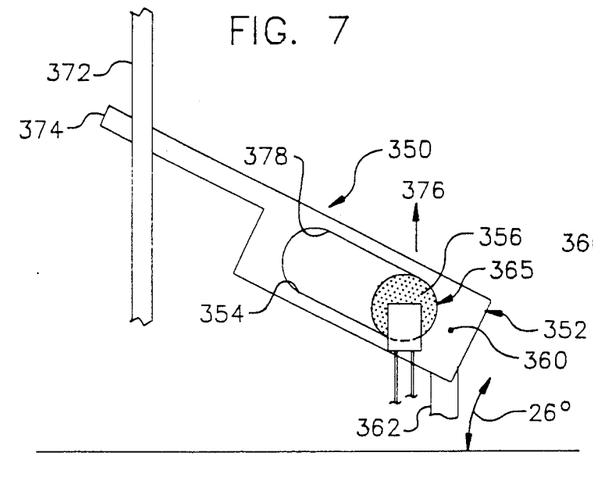
FIG. 7 is a side view of a second type of decelerometer which can be incorporated in the emergency deceleration warning device of FIG. 2.
Figure 8:
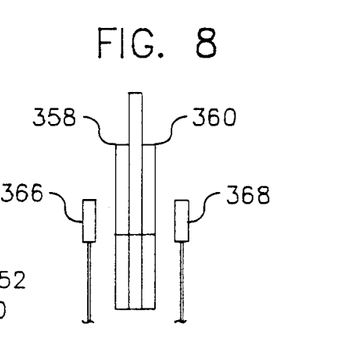
FIG. 8 is an end view of the decelerometer shown in FIG. 7.

The decelerometers we employ in emergency deceleration warning device 22 may take many different forms. One appropriate decelerometer was described above in conjunction with FIGS. 4-6 of the drawing. A second preferred form of decelerometer is illustrated in FIGS. 7 and 8 and identified by reference character 350.

That decelerometer includes an elongated member 352 in which a track 354 is formed.

A rolling opaque element 356, typically a thin cylinder, is trapped in track 354 by transparent covers 358 and 360 fixed to opposite sides of the member 352 in which track 354 is formed.

The assembly of track and rolling element is pivotably fixed as by a pin 360 to the upper end of a bracket 362. At its lower end, bracket 362 is fixed in any convenient fashion to the casing 32 of warning unit 22.

With decelerometer component 352 inclined at a typical, 26° angle from the horizontal shown in FIG. 7, rolling element 356 rests in the bottom end 365 of track 354. When the vehicle (hereinafter referred to as vehicle 20) equipped with an emergency deceleration warning device as depicted in FIGS. 2 and 3 but employing decelerometer 350 decelerates, rolling element 356 moves up track 354. The point to which it travels is determined by the rate of deceleration.

If that deceleration is sufficiently rapid to pose a clear and present danger, element 356 will travel up track 354 far enough to allow a beam of energy to pass from an infrared, photoelectric, or other emitter 366 through track 354 and impinge upon an associated detector 368 (the emitter and detector may be incorporated in a single unit such as that identified by reference character 78 in FIG. 5). This causes detector 368 to emit an electrical signal which enables circuit 27. Again, that circuit causes gas-filled discharge lamp 26 to be turned on and off at a rapid rate, signaling following vehicles that an emergency exists.

Once the deceleration of vehicle 20 falls below the level posing a danger, element 356 will retreat toward the lower end 365 of track 354. There, it interrupts the beam of radiation from emitter 366. Thereafter, flasher 26 will be turned off, provided that the minimum period of operation controlled by circuit 27 has expired.

Like the decelerometer 24 discussed above, decelerometer 350 can be adjusted to compensate for the surface over which vehicle 20 is traveling. This allows the deceleration of vehicle 20 required for activation of visual warning display 26 to be decreased as the coefficient of friction between that surface and the tires 370 of vehicle 20 decreases, for example.

In particular, a retainer 372 incorporated in decelerometer 350 engages a pointer 374 at the end of decelerometer member 352. That frictionally retains member 352 in the angular position to which it is adjusted. A scale, again reading in G force or road condition, and not shown in the drawings, can be added to retaining member 372 to facilitate the adjustment of decelerometer 350 to changing road conditions.

The advantage of the decelerometer 350 just described is that it is less apt to enable circuit 27 if a shock is transmitted to it by virtue of vehicle 20 hitting a bump or a chuckhole, for example. The imposition upon rolling element 356 of a force resulting from that type of incident merely tends to move the element vertically as suggested by arrow 376 in FIG. 7. However, because element 356 is kept from moving in that direction by the upper side 378 of track 354, it cannot uncover the optical path between emitter 366 and detector 368. Therefore, visual warning display 26 is not falsely triggered merely by vehicle 20 passing over a bump or hitting a chuckhole.

Figure 9:
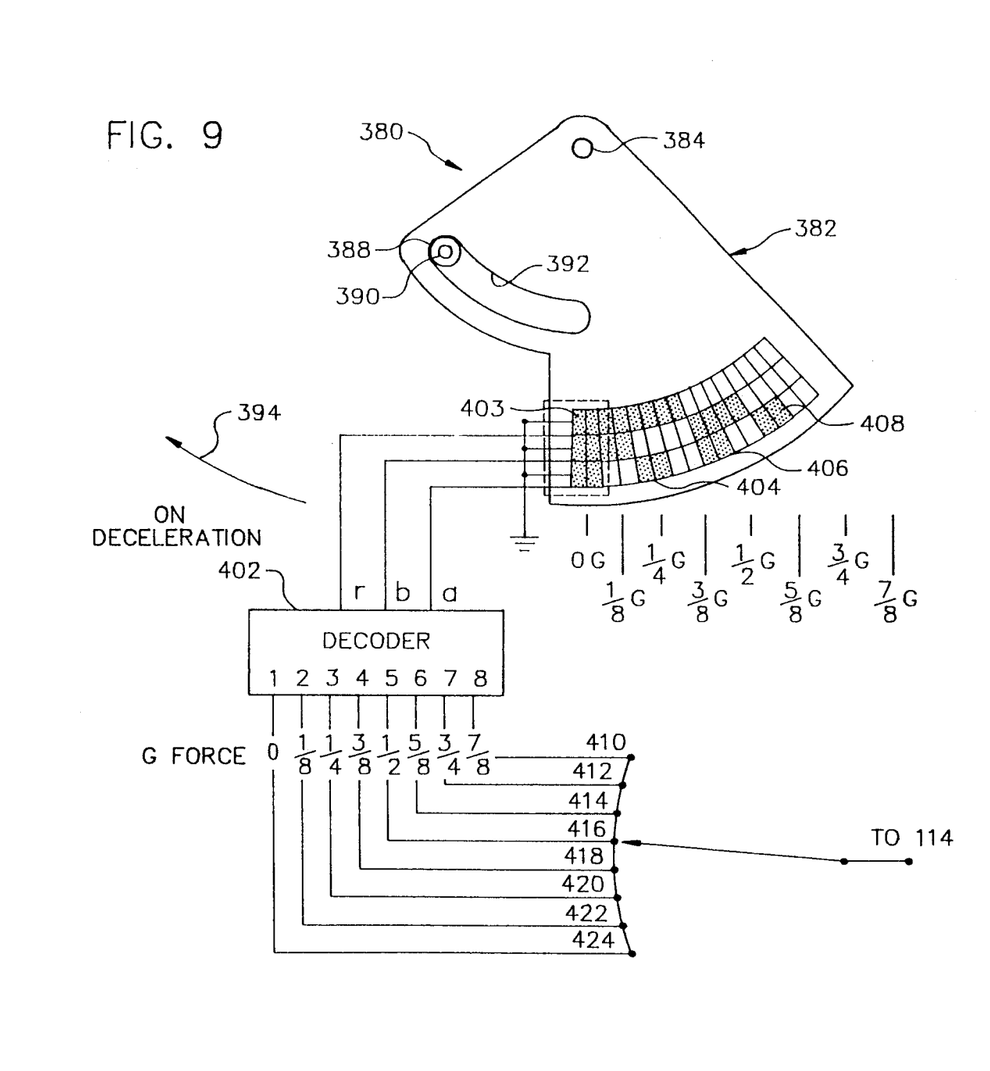
FIG. 9 is a side view of a third form of decelerometer which can be employed in the warning device of FIG. 2.
Figure 10:
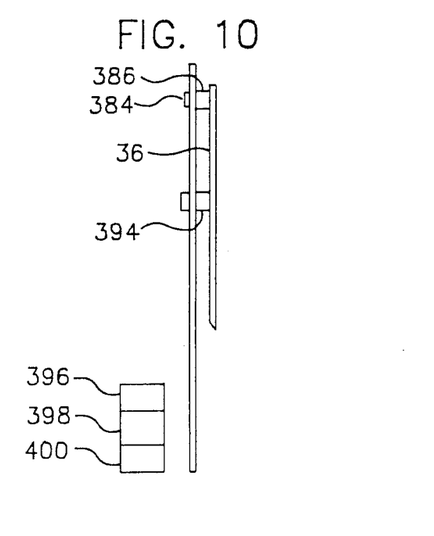
FIG. 10 is an end view of the decelerometer shown in FIG. 9.

A third, exemplary decelerometer 380 which can be employed in the emergency deceleration warning device 22 of FIGS. 2 and 3 is illustrated in FIGS. 9 and 10. That decelerometer also includes a pendulum—in this case identified by reference character 382. Pendulum 382 is pivotably supported from the side wall 36 of warning device casing 32 as by a pivot pin 384 and a tubular spacer 386.

Absent deceleration of vehicle 20, pendulum 382 hangs from pivot pin 384 in the position or orientation shown in FIG. 9. As vehicle 20 decelerates, pendulum 382 swings about pivot member 384 in the clockwise direction indicated by arrow 394 in FIG. 9. The magnitude of the pendulum swing is proportional to the magnitude of deceleration of vehicle 20.

A stop 390 extends through an arcuate track 392 in the pendulum. The stop is fixed to warning device casing side wall 36 by fastener 394. This stop limits the travel of pendulum 382, keeping the pendulum from hitting other components of decelerometer 380.

The arc through which pendulum 382 swings is identified by a system which includes: (1) three emitter/detector units 396, 398, and 400; (2) a solid state decoder 402 such as a 4051BCP; and (3) reflective patches 403, 404, 406, and 408 on pendulum 382. This system of reflective patches is designed so that a unique combination of the three emitter/detector units 396, 398, and 400 shown in the following table will lie opposite a different reflective patch for each of the eight deceleration rates ranging from zero to seven-eighths G over which decelerometer 380 is designed to operate.

| DECELERATION (G) | ACTIVE EMITTER/DETECTOR UNIT(S) |
|---|---|
| 0 | 396, 398, 400 |
| 1/8 | 396, 398 |
| 1/4 | 396, 400 |

| DECELERATION (G) | ACTIVE EMITTER/DETECTOR UNIT(S) |
|---|---|
| 3/8 | 396 |
| 1/2 | 398, 400 |
| 5/8 | 398 |
| 3/4 | 400 |
| 7/8 | None |

When it is located opposite a reflective patch, the detector (not separately shown) in each of the units 396, 398, and 400 will become active by virtue of light from the emitter of the unit (typically, a LED) being reflected back on to its detector. With light being reflected back upon it, the detector element of each unit 396, 398, and 400 will generate an electrical output signal.

The signals from the three detectors are applied to, respectively, input pins C, B, and A of decoder 402. Depending upon the particular combination of units 396, 398 and 400 that is active, the decoder will generate at one of its outputs 1 through 8 a signal indicative of the rate of deceleration of vehicle 20 as detected by pendulum 382.

Conventional, manually operated switches 410 . . . 424 are employed to connect a selected one of the decoder outputs 1 through 8 to visual warning display operating circuit 27. Depending upon the output that is selected, circuit 27 will be enabled and visual warning display 26 flashed on and off whenever the rate of deceleration represented by the selected output is reached. Alternatively, appropriate sensors (not shown) can be incorporated in emergency deceleration warning device 22 to ascertain road conditions and automatically connect the appropriate one of the decoder outputs 1 through 8 to circuit 27.

The invention may be embodied in specific forms in addition to those discussed above without departing from the spirit or essential characteristics thereof. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed is:

1. An emergency deceleration warning device comprising: a decelerometer for measuring the deceleration of a vehicle equipped with said warning device; transducer means for outputting a circuit enabling signal for a duration of period in which, and only in which, the deceleration of the vehicle as measured by said decelerometer is at or above a threshold level; a visual warning display; and circuit means enabled by the signal outputted from said transducer means for turning said visual display on and off at a rapid, selected rate for so long as said circuit means remains enabled, said decelerometer comprising an inclined plane and an element which is effective to roll up said plane a distance proportional to the level and duration of the deceleration of said vehicle and said device further comprising: a source of visible or infrared radiation, said radiation source and said transducer means being located on opposite sides of said inclined plane and so constructed and interrelated that said element is effective upon its reaching a position along said inclined plane corresponding to said threshold level of deceleration, or a position beyond the aforesaid position, to intercept the visible or infrared radiation emitted from said source toward said transducer means and thereby make said transducer means capable of outputting said enabling signal; and thermal protection means for disenabling said circuit means if the temperature reached by a protected component of said circuit means exceeds a preselected level and for maintaining the circuit means in a disenable state until the protected component cools to said preselected level, said circuit means comprising a switching regulator which is required to be turned on for said visual warning display to be turned on and off as aforesaid and said thermal protection means comprising a heat sensitive voltage regulating means: (a) which is connected to a terminal of said switching regulator; (b) which is disposed in heat transfer relationship to said switching regulator; and (c) which is effective upon reaching a selected temperature to so alter the voltage at a switching regulator terminal as to turn off said switching regulator.

2. An emergency deceleration warning device as defined in claim 1 which comprises means for preventing said rolling element from moving upwardly away from said inclined plane, thereby keeping vertical shocks imparted to said vehicle by bumps or potholes from falsely triggering said transducer means into outputting an enabling signal, said preventing means comprising an elongated ledge above and paralleling a track and spaced therefrom a distance substantially equal to the diameter of the rolling element.

3. An emergency deceleration warning device as defined in claim 1 which includes means incorporated in said decelerometer for adjusting the threshold level of deceleration at which said transducer means will become effective to output said enabling signal and thereby cause said circuit means to effect the aforesaid rapid turning on and off of said visual warning display, said decelerometer comprising support means at one end thereof about which said inclined plane can be rotated to adjust the angle to the horizontal of said inclined plane and thereby change the deceleration required to roll said element up said inclined plane to a specified location and means toward the other end of the inclined plane for maintaining the inclined plane at the angle to which said inclined plane is adjusted.

4. An emergency deceleration warning device as defined in claim 1 wherein said display operating circuit means is so designed as to automatically restore to an initialized condition upon expiration of the period provided by a timer with a preset time.

5. An emergency deceleration warning device as defined in claim 1 which includes: means for ensuring that said visual display continues to be turned on and off at said selected rate for a period of specified duration after the enabling signal is no longer supplied to said circuit means which turns said display on and off.

6. An emergency deceleration warning device as defined in claim 5 wherein said visual warning display further comprising: a timing circuit for maintaining said circuit means in its enabled state for said period of specified duration and means operable coincident with the deceleration of the vehicle dropping below a selected rate for activating said timing circuit.

7. An emergency deceleration warning device as defined in claim 1 which includes means for manually activating said circuit means for a period of operator selected duration, whereby said visual warning display, which is automatically activated by deceleration at or above the threshold level, can be activated to furnish a visual warning in circumstances in which said vehicle is stationary or is not being decelerated at a sufficiently high rate to cause said decelerometer to trigger said transducer means.

8. An emergency deceleration warning device as defined in claim 1 wherein said voltage regulating means is a diode with a P-J junction which collapses at said selected temperature.

9. An emergency deceleration warning device as defined in claim 1 in which said circuit means includes means which is effective to cause said circuit means to turn said visual warning display on and off at a second, slower rate to thereby conserve the energy stored in the source from which said circuit means is powered, the means for causing said circuit means to turn said visual display on and off at said slower rate comprising a timing capacitor for controlling the rate at which the visual display is turned on and off and switch means activatable by a switch other than said transducer means for increasing the resistance in the capacitor charging circuit, thereby increasing the time required to charge the capacitor and decreasing the rate at which the visual display is turned on and off to said second, slower rate.

10. An emergency deceleration warning device as defined in claim 1 in which said circuit means has an input for the signal outputted from said transducer, at least one additional input from which a signal for enabling said circuit means can be derived, and means effective if the enabling signal is taken from said additional input for turning said visual display on and off at a second rate which is slower than said rapid selected rate.

11. An emergency deceleration warning device as defined in claim 10 wherein said visual warning display comprises a capacitor that is required to be charged to turn said visual display on and wherein the means incorporated therein for causing said circuit means to turn said visual display on and off at said second rate comprises resistors and means effective when the enabling signal is taken from said additional input for placing said resistors in series with said capacitor, whereby it will take said capacitor longer to charge and correspondingly decrease the rate at which said display can be turned on.

12. An emergency deceleration warning device as defined in claim 1 in which said circuit means includes a timing capacitor that is required to be charged before said visual display can be turned on and a charging circuit for said capacitor, there being a variable resistor in said charging circuit for altering the changing rate of said capacitor and thereby changing the rate at which the visible display is turned on and off.

13. An emergency deceleration warning device comprising: a decelerometer for measuring the deceleration of a vehicle equipped with said warning device; transducer means for outputting a circuit enabling signal for a duration of period in which the deceleration of the vehicle as measured by said decelerometer is at or above a threshold level; a visual warning display; circuit means enabled by the signal outputted from said transducer means for turning said visual display on and off at a rapid, selected rate for so long as said circuit means remains enabled; and means for turning off said circuit means to conserve energy if the voltage of the power source for said circuit means falls below a specified level for a period of selected duration, there being means incorporated in said circuit means for ensuring that said visual warning display is operated for a specified minimum period of time even if the power source voltage falls below a selected minimum during that period.

14. An emergency deceleration warning device comprising: a decelerometer for measuring the deceleration of a vehicle equipped with said warning device; transducer means for outputting a circuit enabling signal for the durations of periods in which the deceleration of the vehicle as measured by said decelerometer is at or above a threshold level; a visual warning display; circuit means enabled by the signal outputted from said transducer means for turning said visual display on and off at a rapid, selected rate for so long as said circuit means remains enabled; and thermal protection means for disenabling said circuit means if the temperature reached by a protected component of said circuit means exceeds a preselected level and for maintaining the circuit means in a disenable state until the protected component cools to said preselected level, said circuit means comprising a switching regulator which is required to be turned on for said visual warning display to be turned on and off as aforesaid, said thermal protection means comprising a heat sensitive voltage regulating means: (a) which is connected to a terminal of said switching regulator; (b) which is disposed in heat transfer relationship to said switching regulator; and (c) which is effective upon reaching said selected temperature to so alter the voltage at said switching regulator terminal as to turn off said switching regulator, and said device further including means incorporated in said display operating circuit means for bypassing said thermal protection means and maintaining said circuit means in the enabled condition for a period of specified finite duration even if the temperature reached by the protected component reaches and exceeds said selected temperature.

* * * * *